Aug. 5, 1952 P. GREEN 2,605,797
PEANUT BLANCHING MACHINE
Filed July 17, 1948 6 Sheets—Sheet 1

Inventor:
Philip Green,
By Kinney, Jenney, Witter & Hildreth
Attorneys

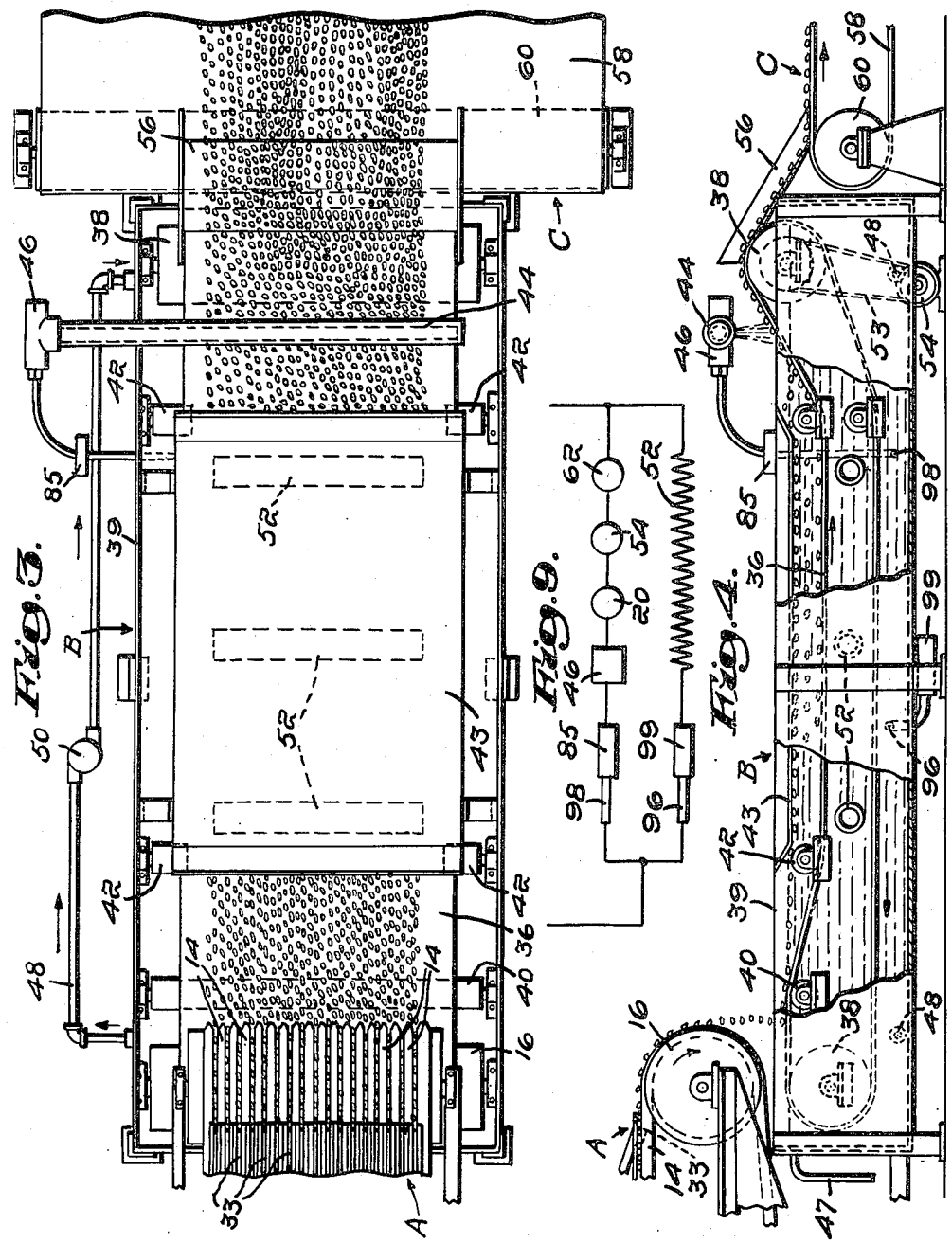

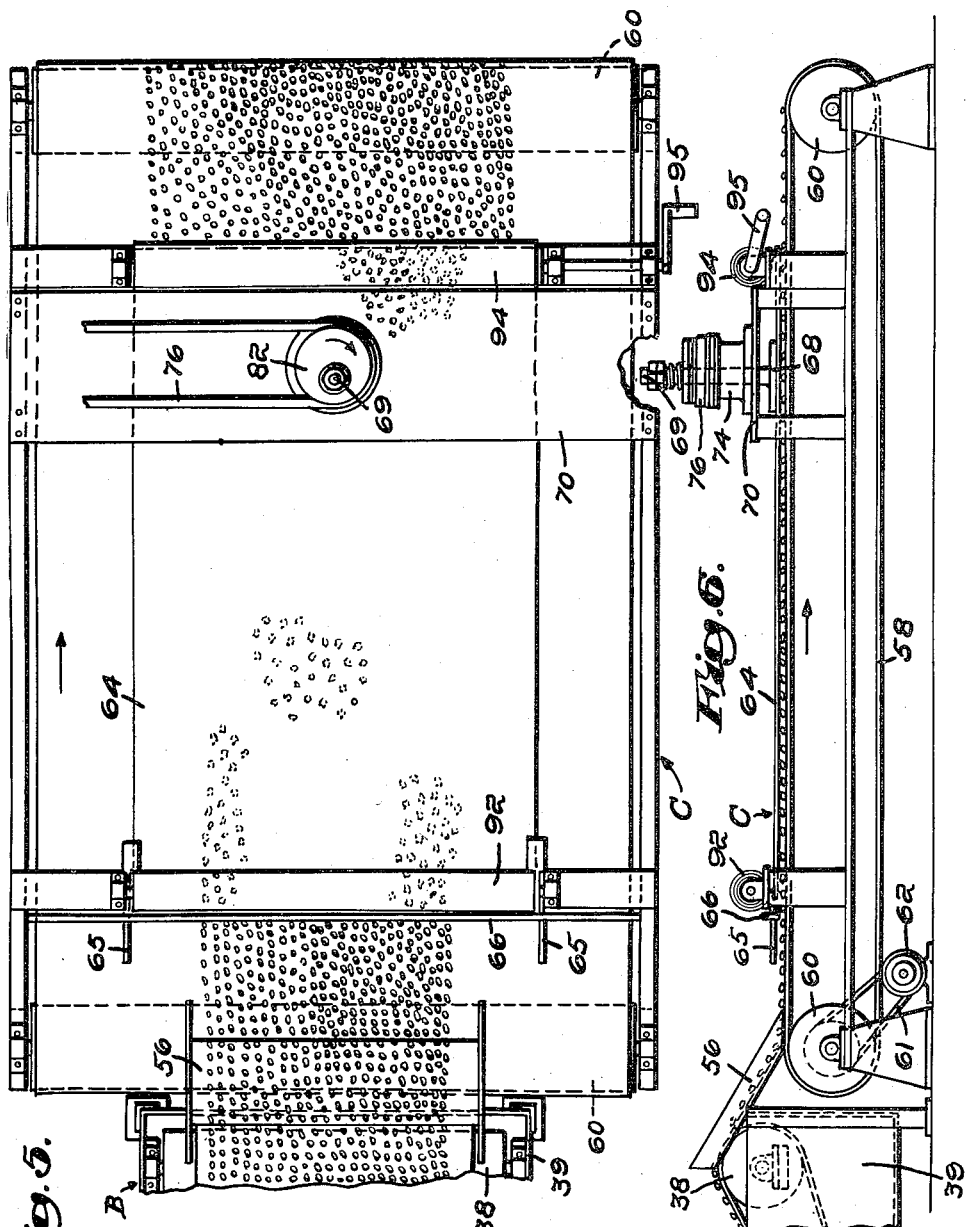

Aug. 5, 1952 P. GREEN 2,605,797
PEANUT BLANCHING MACHINE
Filed July 17, 1948 6 Sheets-Sheet 4
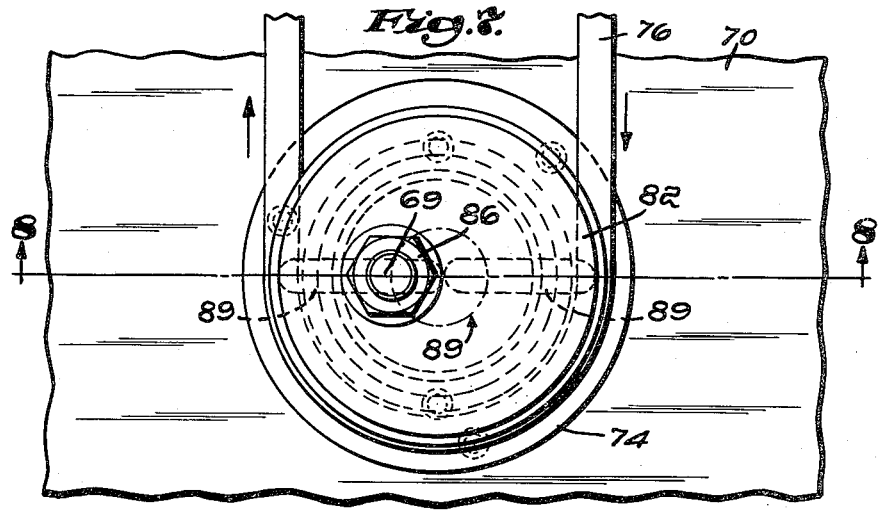
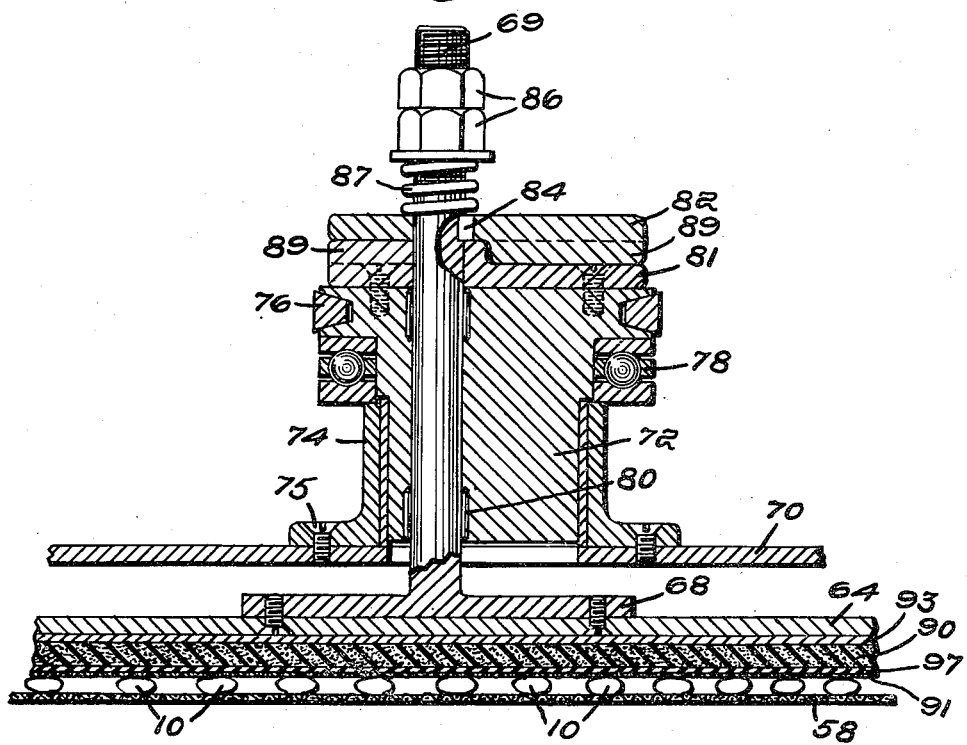
Inventor:
Philip Green Aug. 5, 1952     P. GREEN     2,605,797
PEANUT BLANCHING MACHINE Filed July 17, 1948     6 Sheets-Sheet 5

Inventor:
Philip Green

Aug. 5, 1952 P. GREEN 2,605,797
PEANUT BLANCHING MACHINE
Filed July 17, 1948 6 Sheets-Sheet 6
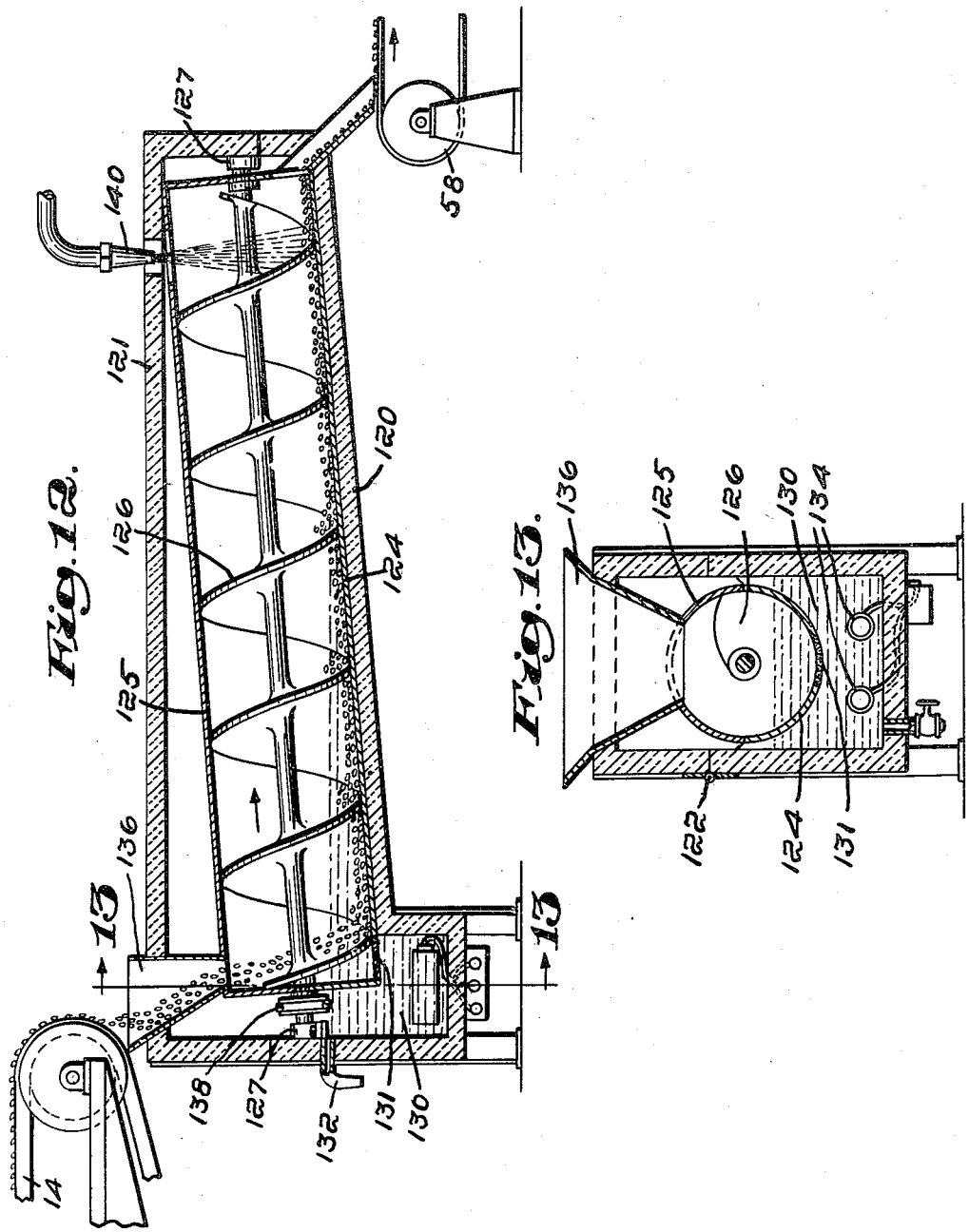
Inventor:
Philip Green,
by Kenway, Jenney, Witter & Hildreth
Attorneys Patented Aug. 5, 1952

2,605,797

UNITED STATES PATENT OFFICE 2,605,797

PEANUT BLANCHING MACHINE

Philip Green, Seabrook, N. H., assignor to James W. Gardner, Tyrone, Pa.

Application July 17, 1948, Serial No. 39,211

6 Claims. (Cl. 146—32)

This invention relates to machines for blanching peanuts, i. e. removing the hulls or skins from shelled nuts, and the primary object of the invention resides in the production of an improved machine for performing this function.

The removal of the skins from the nuts is greatly facilitated and with less damage to the nuts when the skins are slitted from end to end and I have found that this slitting is done most efficiently by arranging the nuts in continuous rows and continuously passing the nuts thus arranged in contact with slitting knives which thereupon slit the skins from end to end as the nuts pass the knives.

My improved machine embodies an endless conveyor having parallel and longitudinally extending nut carrying troughs in its outer face for receiving nuts and arranging and conducting them longitudinally in a plurality of rows past skin slitting knives cooperating with the troughs. The slitted nuts are then conducted through a scalding bath thermostatically controlled to predetermined temperature, and from thence to and through a novel rubbing and skin removing apparatus comprising a part of the invention. The nut slitting, scalding and skin removing mechanisms are operated simultaneously and in cooperation and a further feature of the invention includes thermostatically controlled means for operating all of such mechanisms only when the scalding bath is up to predetermined temperature.

In some cases it may be desirable to scald the nuts prior to slitting the skins and my invention embodies a relatively simple machine for slitting and removing the skins from such scalded nuts. The nut conveyor of this machine embodies a plurality of narrow belts providing nut feeding troughs therebetween and wherein the rows of nuts are continuously subjected to slitting knives. Following the slitting operation, the nuts are forced downwardly through the conveyor between the belts which operation serves to remove the hulls. The production of a machine of this nature comprises a further object of the invention.

These and other features of the invention will be best understood and appreciated from the following description of preferred embodiments thereof selected for purposes of illustration and shown in the accompanying drawings in which.

Figure 1:
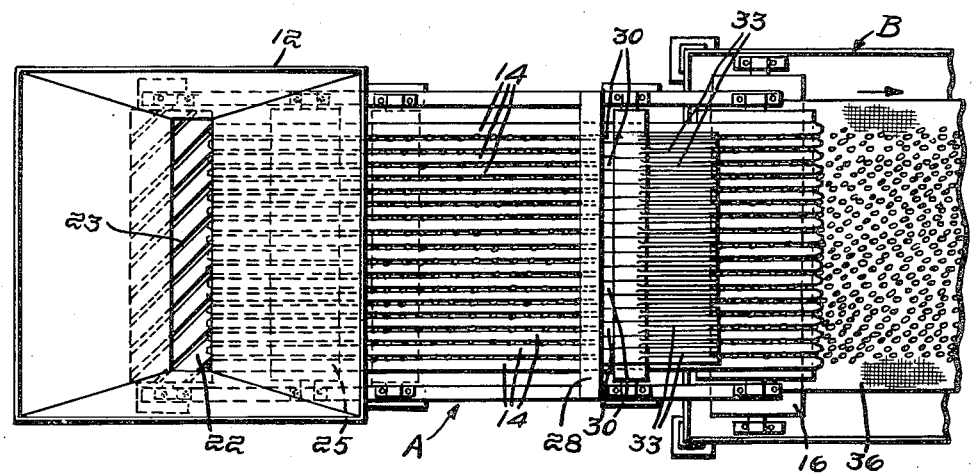
Fig. 1 is a plan view of the skin slitting portion of my machine.
Figure 10:
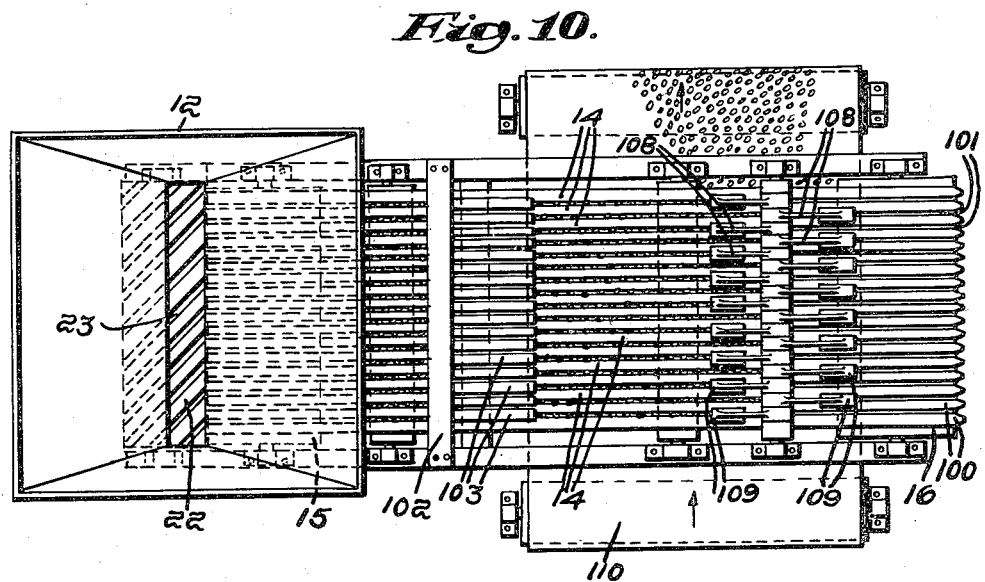
Figure 11:
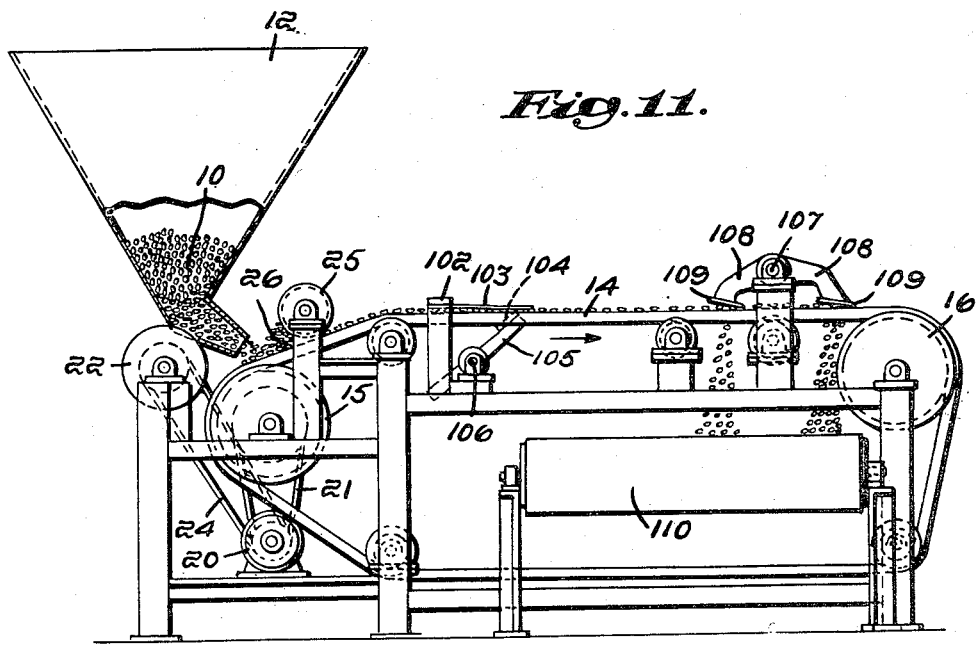

Fig. 3 is a plan view of the scalding portion of the machine cooperating with Fig. 1, Fig. 4 is a side elevation thereof, Fig. 5 is a plan view, partially in section, of the skin removing portion of the machine cooperating with Fig. 3, Fig. 6 is a side elevation thereof, Fig. 7 is an enlarged fragmentary plan view of a portion of Fig. 5, Fig. 8 is a fragmentary sectional view taken on line 8—8 of Fig. 7, Fig. 9 is a wiring diagram of the electric controls, Fig. 10 is a plan view of a modified construction, Fig. 11 is a side elevation thereof, Fig. 12 illustrates a modified form of conveyor-scalding mechanism, and Fig. 13 is a sectional view taken on line 13—13 of Fig. 12.

Referring first to the machine shown in Figs. 1-9 of the drawings, A (Figs. 1 and 2) indicates the hull slitting portion of the machine, B (Figs. 3 and 4) the scalding portion, and C (Figs. 5 and 6) the hull removing portion.

Figure 2:
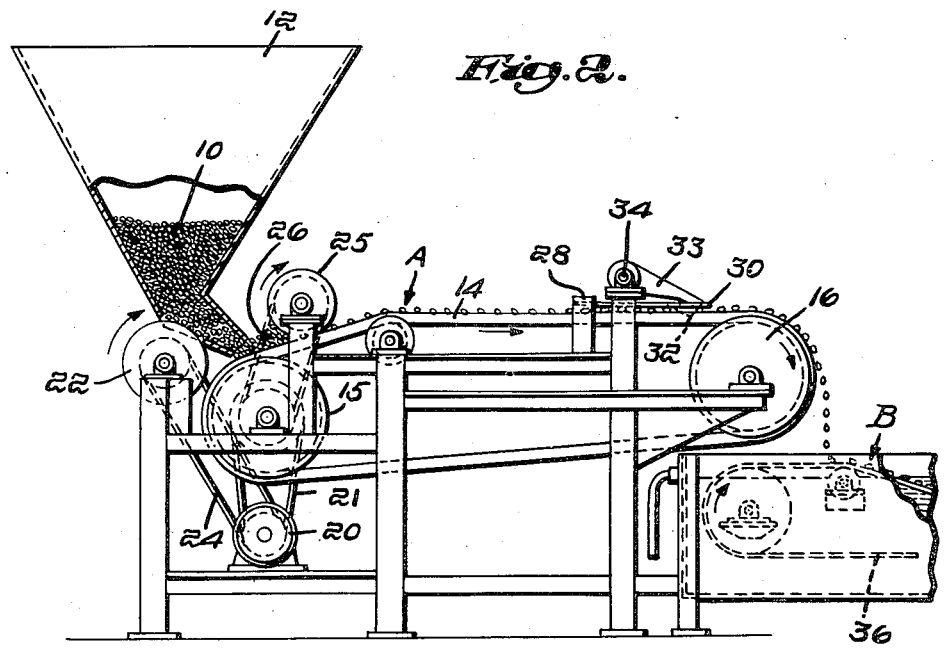
Fig. 2 is a side elevation thereof.

In Figs. 1 and 2, peanuts 10 are fed from a hopper 12 to an endless conveyor 14 supported on rollers 15 and 16. The top reach of the conveyor is driven from the hopper forwardly in the direction of the arrow and its outer face is grooved to provide a plurality of parallel peanut carrying troughs 18 disposed across and extending longitudinally of the conveyor. If desired the conveyor can be formed from a plurality of narrow belts providing troughs therebetween, as illustrated in Figs. 10 and 11.

The conveyor 14 is driven by a motor 20 through a belt 21. A nut feeding roller 22 extends into the hopper and is driven from the motor through a belt 24. A spiral groove 23 in the roller aids in distributing the nuts onto the conveyor. The nuts pass from the hopper onto the conveyor forwardly of a nut distributing feed roller 25 driven by a belt 26. The function of the roller 25 is to assist in arranging the nuts in the troughs 18 and permit only a single layer of nuts to pass therebeneath. The troughs are V-shaped in cross section and under the action of the roller 25 the nuts, which are of oblong shape (Fig. 8), arrange themselves longitudinally in the troughs.

Supported on a transverse bar 28 and disposed over and longitudinally of the troughs are a plurality of spring fingers 30, constructed either in one or a plurality of pieces. The fingers are slotted directly over each trough and extending downwardly through each slot and cooperating with its trough is a thin slitting blade 32. The blades are fixed to the free ends of arms 33 mounted on a transverse shaft 34. The weight of the arms normally maintains the blades in the nut engaging and slitting position illustrated in Fig. 2 or they may be spring loaded if desired. In their extreme downward position, illustrated in Fig. 1, the arms abut against the fingers 30 which serve as a stop.

In Figs. 3 and 4 the forward portion of an endless conveyor 36 is disposed beneath the delivery end of the conveyor 14 to receive the slitted nuts therefrom. The conveyor 36 is carried on rolls 38 and is disposed within a tank 39 adapted to hold a nut scalding liquid. The top reach of the conveyor passes over a supporting roll 40 and from thence dips downwardly into the tank beneath marginal rolls 42. The liquid bath is maintained at a level substantially above the depressed portion of the top reach between the rolls 42 and a plate 43 is provided thereabove for causing submerging of the nuts as they are conducted through the bath. A fresh water spray 44 under the control of a solenoid operated valve 46 is provided for the nuts at the delivery end of the conveyor, and an overflow is provided at 47.

The liquid bath is constantly circulated through a pipe 48 by a pump 50 and is heated by electric heating units 52. Efficient scalding of the nuts requires a predetermined bath temperature and means is provided for automatically maintaining this temperature and operating the machine only when it is thus maintained, all as hereinafter described. The conveyor 36 is driven through a belt 53 from a motor 54 and the scalded nuts are delivered from this conveyor to a chute 56.

In Figs. 5 and 6 the forward portion of an endless conveyor 58 is disposed beneath the delivery end of the chute 56 to receive the scalded nuts therefrom. This conveyor is carried on rolls 60 and is driven through a belt 61 from a motor 62. Disposed in spaced relation over and parallel with the top reach of the conveyor is an aluminum plate 64. The rear end of this plate is supported on two rods 65 extending loosely through a supporting bracket 66. The forward end of the plate is attached to a head 68 integral with the bottom end of a vertical shaft 69. The shaft extends upwardly through a fixed horizontal plate 70 disposed transversely of the conveyor.

As illustrated in Fig. 8, the shaft 69 extends eccentrically through a member 72 rotatably mounted in a bearing 74 fixed to the plate 70 by screws 75. The top end of the member 72 is grooved to receive a driving belt 76 and thrust ball bearings 78 support the member on the bearing 74. Roller bearings 80 support the member for rotation on the shaft 69. Two co-engaging plates 81 and 82 are mounted on the shaft above the member 72, the bottom plate 81 being secured to the member by screws and the top plate 82 being keyed to the shaft at 84. The shaft is supported in the unit by check nuts 86 threaded to the shaft and by an intermediate compression spring 87.

The belt 76 and member 72 are driven in the direction of the arrows (Fig. 7) and it will be apparent that rotation of the member within the bearing 74 moves the shaft 69 in the orbit 88 shown in broken lines in Fig. 7. This action is transmitted to the plate 64 and reciprocates the plate longitudinally and oscillates its forward end transversely and longitudinally. The loose engagement of the rods 65 in the bracket 66 permits of these motions. A moderate vertical reciprocation of the plate 64 is also desirable and such action is effected through the cam-like co-engaging faces of the plates 81 and 82 as indicated at 89 in Fig. 8. The faces can be constructed with high and low spots to jog the plate 64 vertically one or more times at each rotation of the member 72.

The plate 64 together with the following described facings serves as a hull-removing rubbing unit cooperating with the top reach of the conveyor 58. A cushion 90 of sponge rubber is carried on the bottom face of a facing plate 93 secured to the plate 64 and superposed over the bottom face of this cushion is a thin gum rubber sheet 97 and a fabric nut-engaging strip 91. One end of the strip 91 is attached to a supply roll 92 and the other end is connected to a wind-up roll 94 provided with a hand crank 95. Thus the fabric can be renewed or changed merely by rotating the crank. It will be understood that the plate 64 is adjusted to a vertical position to engage the peanuts with suitable hull removing pressure between the fabric facing and the conveyor.

In Fig. 9 I have illustrated a wiring diagram of the electrical controls. One circuit together with a switch at 99 operated by a thermostat 96 in the bath is adapted to open the electric heating circuit when the bath reaches the predetermined scalding temperature. The other circuit includes a valve solenoid at 46 and motors 20, 54 and 62, and a switch at 85 operated by a thermostat 98 in the bath is adapted to break this circuit should the bath drop below the predetermined blanching temperature. Thus the hull slitting, scalding and removing operations are carried on automatically and always at the proper scalding temperature. The thermostatically controlled switch mechanisms are not illustrated in detail since such mechanisms are well known.

The operation of the machine shown in Figs. 1-9 and above described is briefly as follows. Nuts feed from the hopper 12 onto the conveyor 14 and the feed roller 25 causes them to become arranged longitudinally in the troughs 18. As the nuts pass beneath the spring fingers 30 the blades 32 engage and slit the skins from end to end. The slitted nuts then feed directly onto the conveyor 36 which conducts them, submerged beneath the plate 43, through the scalding bath and beneath the fresh water spray at 44. The scalded nuts are delivered to the conveyor 58 which conducts them beneath the rubbing plate 64 which plate is positioned to engage with suitable pressure the nuts between the fabric facing 91 and the conveyor. The oscillating action of the rubbing plate together with its slight vertical jog loosens the hulls and removes them from the nuts. The relatively light hulls can be separated from the nuts in any suitable manner.

It is particularly pointed out that the slitting of the hulls from end to end of the nuts frees the hull along the entire length of the nut and thereby permits complete removal of the hulls, whereas a sidewise or haphazard slitting of the hulls would not thus free the hulls and would result in portions of the hulls remaining on the nuts and the necessity for a harsher rubbing treatment tending to break the nuts.

In Figs. 10 and 11, I have illustrated a modified construction similar to that shown in Fig. 1 but in which the conveyor embodies a plurality of slightly spaced and endless narrow belts 100 providing V-shaped troughs 101 therebetween. This mechanism is adapted to both slit and remove the hulls from the nuts and the hulls on the nuts are scalded prior to entering this machine. The scalded nuts are deposited into the hopper 12 and are fed therefrom to the conveyor as in Fig. 1 and are arranged longitudinally in the troughs as they pass the feed roller 25.

Supported on a transverse bar 102 and disposed over and longitudinally of the troughs are a plurality of spring fingers 103. Disposed beneath the conveyor and cooperating with each finger is a thin slitting blade 104. The blades are carried on the free ends of arms 105 mounted on a transverse shaft 106. The arms are weighted or spring loaded to maintain the blades in the nut engaging and slitting position illustrated in Fig. 11. The free ends of the fingers operate resiliently to hold the nuts against the blades as will be apparent so that the hulls are slitted from end to end as the nuts pass the blades.

Following the slitting of the hulls the nuts are carried beneath mechanism which pushes them downwardly through the conveyor between the belts, which operation serves to remove the hulls. The mechanism illustrated for this purpose comprises a shaft 107 and forwardly and rearwardly extending arms 108 mounted alternately thereon and having feet 109 on their free ends disposed over the troughs for engaging and forcing the peanuts downwardly through the conveyor. The arms are mounted for free rotation on the shaft and the weight of the arms causes the feet to force the nuts downwardly through the conveyor as the traveling nuts engage the downwardly facing inclined surfaces of the feet. A transverse conveyor 110 is provided for receiving the hulled nuts.

In Figs. 12 and 13 I have illustrated a modified form of conveyor-scalding mechanism embodying a spiral conveyor that can be substituted for the endless conveyor shown at B in Figs. 3 and 4. This mechanism embodies a housing 120 provided with a cover lid 121 hinged at 122. Within the housing is a tubular casing embodying a lower trough-like half 124 and a removable upper half 125. A spiral conveyor 126 is mounted in the casing and rotatably supported at its ends 127 in the housing. The bottom wall of the housing 120 is inclined downwardly toward a liquid holding reservoir 130 at one end and the casing 124 is perforated at 131 to permit passage of the liquid therethrough. A scalding bath is provided in the reservoir to the level of an overflow pipe 132. The bath is electrically heated at 134 and the apparatus is controlled in like manner as the apparatus shown in Figs. 3 and 4.

Nuts are delivered from the conveyor 14 through a mouth 136 to the lower end of the casing. The spiral conveyor is rotated by a belt at 138 and carries the nuts upwardly along the casing and through the scalding liquid. A fresh water spray 140 at the top end of the casing washes the nuts before they are delivered to the conveyor 58.

Having thus disclosed my invention, I claim as new and desire to secure by Letters Patent:

1. In a machine for blanching peanuts, a wide and endless conveyor having a plurality of continuous, relatively narrow, V-shaped and parallel peanut carrying troughs in its outer face disposed across the conveyor, means for driving the conveyor in one direction longitudinally of the troughs, means for feeding peanuts onto the conveyor, a nut distributor disposed adjacent to and extending across said outer face rearwardly of the nut feeding position and cooperating with the conveyor automatically to arrange the peanuts in end to end relation in parallel rows in the troughs, and fixed knives respectively associated with the troughs for engaging and slitting the peanut hulls longitudinally of the peanuts solely by movement of the peanuts relative to the knives as the conveyor carries the peanuts along the paths of the troughs.

2. The machine defined in claim 1 in which the conveyor comprises a trough and a spiral conveying member therein and extending longitudinally of the tank.

3. In a peanut blanching machine, the combination of a tank adapted to hold a liquid scalding bath, a conveyor in and extending from end to end longitudinally of the tank and adapted to convey nuts therethrough, one portion of the conveyor being at a lower elevation in the tank relative to a remote portion thereof, a motor for driving the conveyor in a direction to convey nuts from end to end of the tank to said remote portion of the conveyor, means for spraying the nuts at said remote portion, an electric heating unit for the bath, and cooperating means controlled thermostatically from the bath for keeping the bath to predetermined temperature and for operating the motor only when the bath is up to said temperature.

4. The machine defined in claim 1 in which the conveyor embodies a plurality of relatively spaced endless belts providing said troughs therebetween, and a plurality of elements associated with the troughs for engaging the traveling peanuts and pushing them downwardly through the conveyor between the belts and thereby removing the slitted hulls.

5. A peanut hull removing machine comprising an endless conveyor having a horizontal top reach, a rubbing plate disposed parallel with, adjacent to and cooperating with the top reach for engaging and rubbing therebetween peanuts supported on the top reach, a power driven eccentric adjacent to one end of the plate for oscillating the plate in a plane substantially parallel with the top reach, means supporting the plate at its other end in superposed relation over the top reach for movement by the eccentric, a resilient cushion carried on the rubbing plate in superposed relation over said top reach, and a strip of fabric carried on the plate and disposed over the bottom face of the cushion.

6. An apparatus for treating shelled nuts comprising means including parallel V-shaped troughs for arranging nuts in end to end relation in parallel rows, means for moving said troughs longitudinally and passing the arranged nuts longitudinally of the rows past a slitting position, and means for slitting the skins on the nuts from end to end of the nuts by cutting contact therewith as the nuts pass said slitting position, and leaving the body of the nuts substantially intact.

PHILIP GREEN.

REFERENCES CITED

The following references are of record in the file of this patent:

UNITED STATES PATENTS

| Number | Name | Date |
|---|---|---|
| 1,214,234 | Skinner | Jan. 30, 1917 |
| 1,233,653 | Delkin, Sr. | July 17, 1917 |
| 1,350,506 | Kennedy | Aug. 24, 1920 |
| 1,364,083 | Demerath | Jan. 4, 1921 |
| 1,393,168 | Sanguiliano | Oct. 11, 1921 |
| 1,410,951 | Park | Mar. 28, 1922 |
| 1,890,676 | Fox | Dec. 13, 1932 |
| 2,151,401 | Belcher | Mar. 21, 1939 |
| 2,094,880 | Formway | Oct. 5, 1939 |